United States Patent [19]
Kasbo et al.

[11] Patent Number: 5,488,930
[45] Date of Patent: Feb. 6, 1996

[54] ANIMAL LITTER PACKAGE

[75] Inventors: Loyd G. Kasbo, deceased, late of Norcross, by Barbara A. Kasbo, executrix; James D. Cotton, Marietta; Michael T. Morman, Alpharetta; Gabriel H. Adam, Roswell, all of Ga.

[73] Assignee: Kimberly-Clark Corporation, Neenah, Wis.

[21] Appl. No.: 216,737

[22] Filed: Mar. 23, 1994

Related U.S. Application Data

[62] Division of Ser. No. 887,726, May 22, 1992, Pat. No. 5,347,950.

[51] Int. Cl.⁶ .................................................. A01K 29/00
[52] U.S. Cl. .................................................. 119/170
[58] Field of Search .................................... 119/170, 171, 119/174, 165, 167, 168

[56] References Cited

U.S. PATENT DOCUMENTS

| | | | |
|---|---|---|---|
| 2,708,418 | 5/1955 | Sugarman et al. | 119/1 |
| 3,029,783 | 4/1962 | Sawyer et al. | 119/1 |
| 3,059,615 | 10/1962 | Kuceski et al. | 119/1 |
| 3,227,137 | 1/1966 | Goldman et al. | 119/1 |
| 3,377,990 | 4/1968 | Mitchell | 119/1 |
| 3,416,495 | 12/1968 | Wilson | 119/1 |
| 3,570,751 | 3/1971 | Trewella | 229/66 |
| 3,765,371 | 10/1973 | Fisher | 119/1 |
| 3,828,731 | 8/1974 | White | 119/1 |
| 3,916,831 | 11/1975 | Fisher | 119/1 |
| 3,921,581 | 11/1975 | Brewer | 119/1 |
| 3,980,050 | 9/1976 | Neubauer | 119/1 |
| 3,983,842 | 10/1976 | Marion et al. | 119/171 |
| 4,009,684 | 3/1977 | Kliment et al. | 119/1 |
| 4,203,388 | 5/1980 | Cortigene et al. | 119/1 |
| 4,258,660 | 3/1981 | Pris et al. | 119/1 |
| 4,326,481 | 4/1982 | Gruss | 119/171 |
| 4,441,451 | 4/1984 | Neal | 119/1 |
| 4,494,482 | 1/1985 | Arnold | 119/1 |
| 4,519,340 | 5/1985 | Dickey | 119/1 |
| 4,537,148 | 8/1985 | Lowe, Jr. | 119/171 X |
| 4,560,527 | 12/1985 | Harke et al. | 264/500 |
| 4,607,594 | 8/1986 | Thacker | 119/1 |
| 4,619,862 | 10/1986 | Sokolowski et al. | 428/221 |
| 4,621,011 | 11/1986 | Fleischer et al. | 428/221 |
| 4,627,382 | 12/1986 | Muzzey | 119/1 |
| 4,628,863 | 12/1986 | Eichenauer | 119/1 |
| 4,638,763 | 1/1987 | Greenberg | 119/1 |
| 4,712,508 | 12/1987 | Lowe | 119/171 X |
| 4,744,673 | 5/1988 | Nakamura | 383/38 |
| 4,784,083 | 11/1988 | Kiel | 119/171 X |
| 4,828,912 | 5/1989 | Hossain et al. | 428/289 |
| 4,897,304 | 1/1990 | Hossain et al. | 428/289 |

(List continued on next page.)

FOREIGN PATENT DOCUMENTS

| | | | |
|---|---|---|---|
| 1038297 | 9/1978 | Canada | 119/1 |
| 2754620 | 6/1979 | Germany | 119/170 |
| 3117900 | 11/1982 | Germany | 119/170 |
| 2203925 | 11/1988 | United Kingdom | 119/171 |

*Primary Examiner*—Thomas Price
*Attorney, Agent, or Firm*—Karl V. Sidor

[57] ABSTRACT

There is disclosed an animal litter composition and a package for the composition. The composition constitutes decorticated flax straw which as been screened to particle sizes between about 10 and 22 U.S. Screen Mesh. The litter further includes a virucidal composition and a fragrance. The virucidal composition includes from about 0.05 to about 5 percent by weight based on the dry weight of the decorticated flax straw of a preferably anionic surfactant, and at least about 2 percent, based on the dry weight of the decorticated flax straw of at least one acid selected from a group consisting of citric, malic, and mixtures of the acids.

The animal litter package constitutes a bag formed from a web of film, nonwoven/film laminates, film/paper laminate or wax/paper laminate in which the animal litter is contained prior to use. The bag can then be opened to serve as a litter box liner. Once the litter has been used, the edges of the bag can be regathered to form a bag for disposal of the litter.

18 Claims, 3 Drawing Sheets

U.S. PATENT DOCUMENTS

| | | | |
|---|---|---|---|
| 4,924,808 | 5/1990 | Pirotte | 119/1 |
| 4,981,104 | 1/1991 | Goodwin | 119/168 |
| 5,018,482 | 5/1991 | Stanislowski et al. | 119/173 |
| 5,031,578 | 7/1991 | Hammons et al. | 119/167 |
| 5,035,205 | 7/1991 | Schiller et al. | 119/168 |
| 5,038,721 | 8/1991 | Ouellette et al. | 119/167 |
| 5,041,410 | 8/1991 | Ivie | 119/171 |
| 5,054,434 | 10/1991 | Wax et al. | 119/171 |
| 5,059,577 | 10/1991 | Hatton | 502/404 |
| 5,060,598 | 10/1991 | Richards | 119/171 |
| 5,065,702 | 11/1991 | Hasiuk | 119/168 |
| 5,080,043 | 1/1992 | Fields | 119/165 |
| 5,080,044 | 1/1992 | Bosworth | 119/168 |
| 5,085,175 | 2/1992 | Clements, Jr. et al. | 119/171 |
| 5,189,987 | 3/1993 | Stanislowski et al. | 119/171 |
| 5,209,185 | 5/1993 | Chikazawa | 119/171 |
| 5,209,186 | 5/1993 | Dewing | 119/172 |

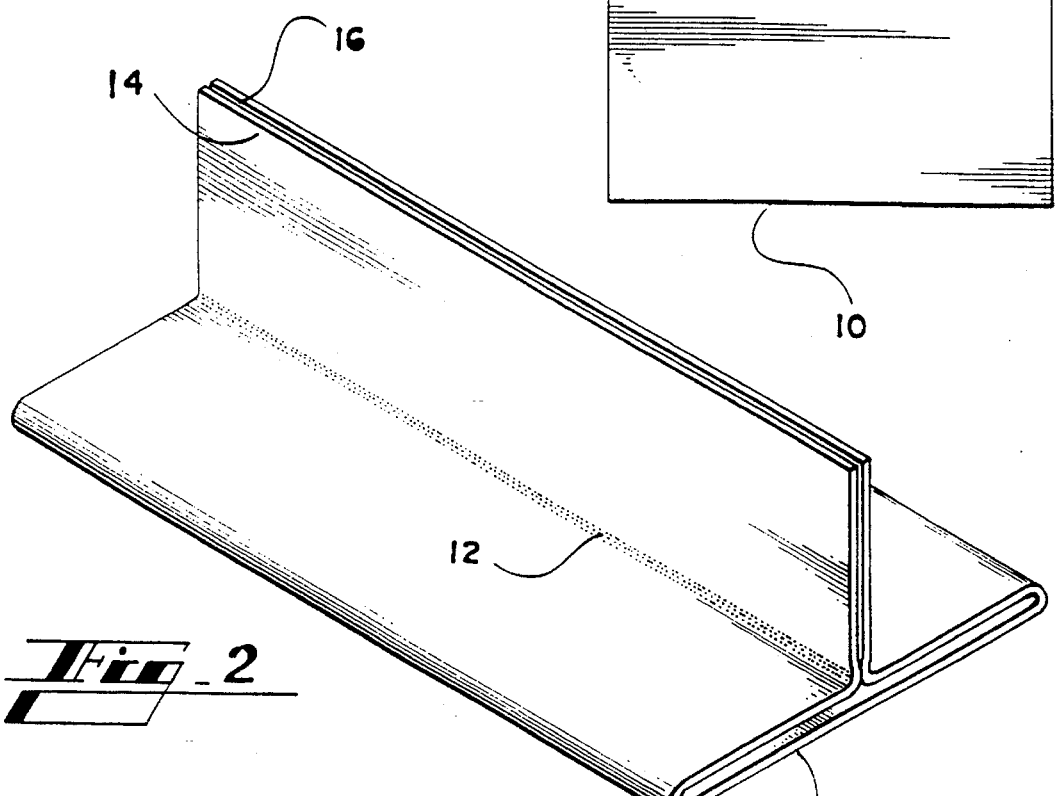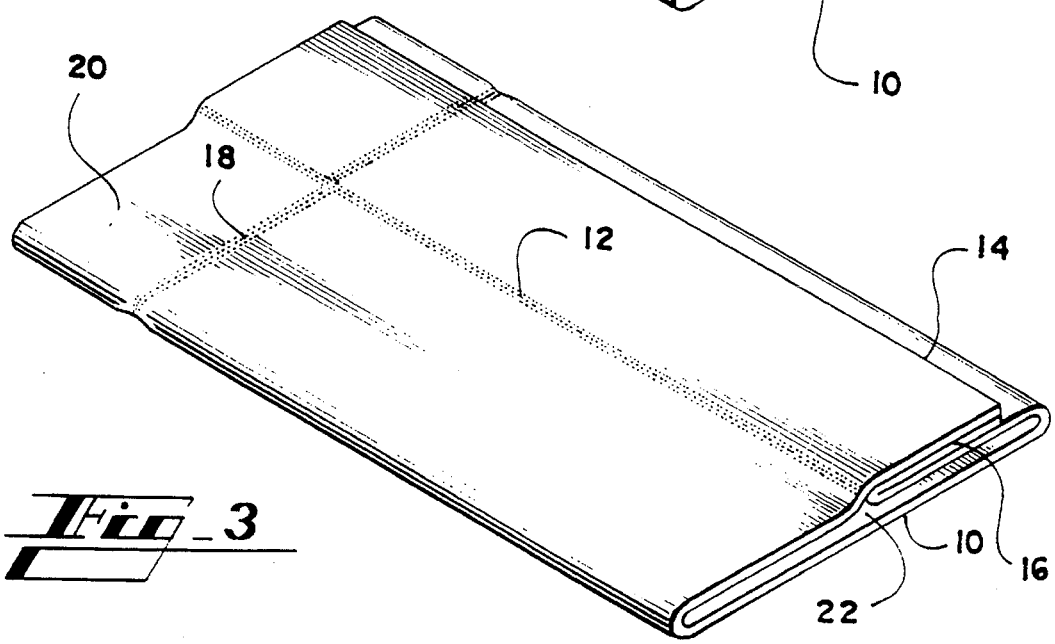

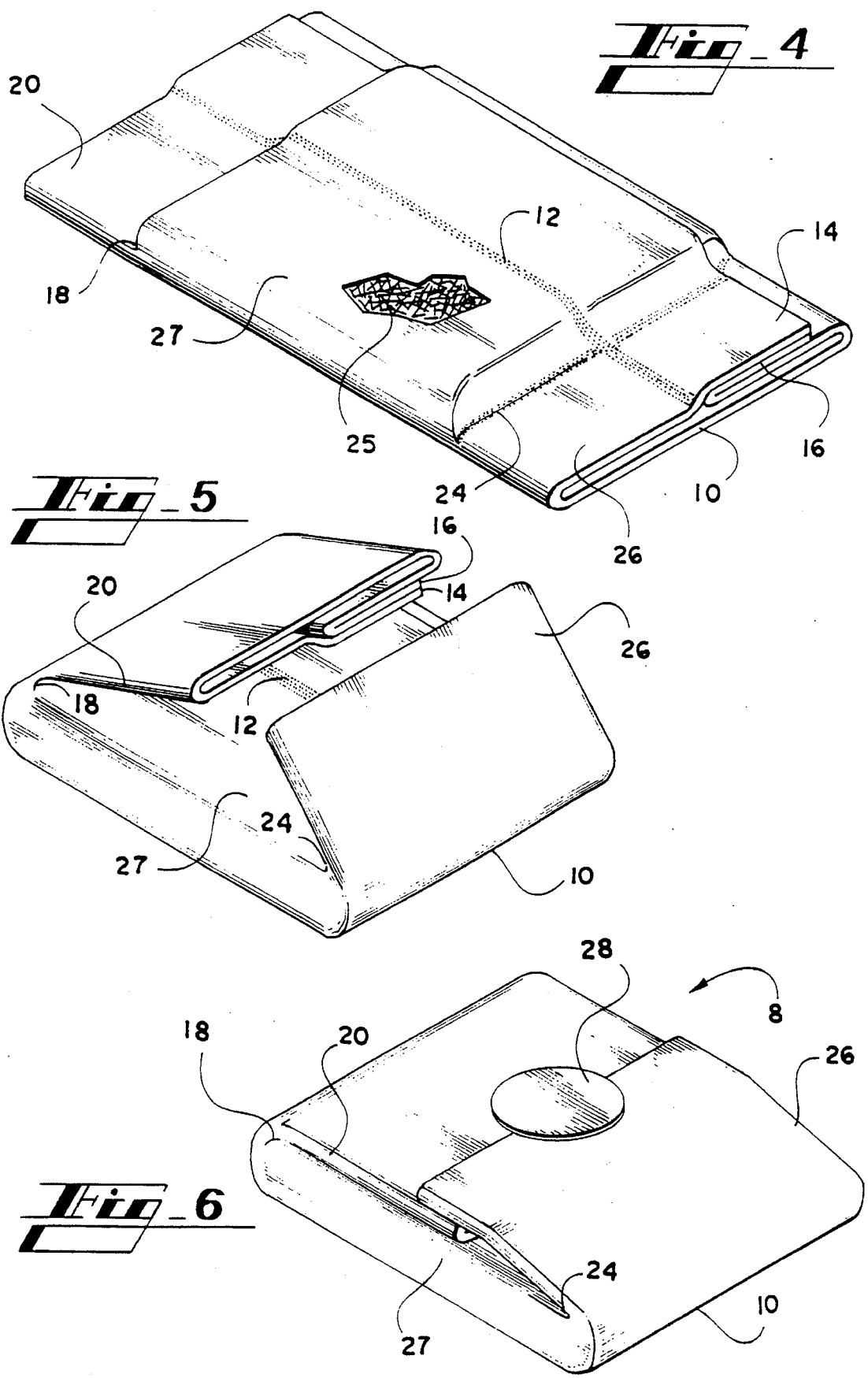

ANIMAL LITTER PACKAGE

This is a divisional application of application Ser. No. 07/887,726, filed on May 22, 1992, now U.S. Pat. No. 5,347,950.

BACKGROUND OF THE INVENTION

This invention relates generally to animal litter, and more particularly concerns an improved animal litter composition and package for the same.

It is well known in the art to provide litter for domesticated animals, particularly cats. In order to be efficacious, animal litter must exhibit certain characteristics and properties. The litter must be absorbent of moisture and must have the ability to adhere to and thereby coat fecal material. The litter should not be toxic to the animals. Where litter is provided in a litter box as for cats, the litter should not be easily tracked from the litter box by the cats. In addition, it is desirable that the litter be low density. Environmental considerations suggest that the litter be made from a renewable resource. Further, it is desirable that the litter have the ability to inhibit the spread of viruses. The litter should also have a pleasing odor to the caretaker of the animals, and importantly should inhibit odor formation resulting from the bacterial action on the animal's waste. Inhibiting odor resulting from bacterial action on cat urine is a particularly desirable attribute for cat litter. It is also important to the animal's caretaker that the litter be packaged so that it is easily dispensed for use and then easily collected for disposal without the need for touching or otherwise unnecessarily handling the used litter material.

At the present time, commercial litters for cats are made from clays which are heavy (about 48 pounds per cubic foot) and are provided in bulk bags to be poured into litter boxes. None of the prior art litters that are available have all of the desirable characteristics mentioned above.

SUMMARY OF THE INVENTION

It is therefore an object to provide an animal litter which is absorbent of moisture.

It is further an object of the present invention to provide an animal litter which has the ability to adhere to and coat fecal matter.

Moreover, it is an object of the present invention to provide a litter that is not toxic to domesticated animals.

It is also an object of the present invention to provide a litter that when used in litter boxes, is not readily tracked from the litter box.

It is further an object of the present invention to provide a litter that is relatively low in density compared to commercially available cat litters. It is further an object of the present invention to provide a litter that is made from an annually renewable resource.

It is further an object of the present invention to provide an animal litter which will inhibit the spread of viruses.

It is an ancillary object of the present invention to provide a litter which will inhibit odors that result from bacterial action on the animal's waste. It is particularly an object of the present invention to inhibit the odor associated with cat urine.

It is also an object of the present invention to provide a litter which has a pleasing odor to the caretaker of the animal.

It is further an object of the present invention to provide a litter package in which the litter is securely retained prior to use.

It is further an object of the present invention to provide a litter package including a bag which bag is easily opened by means of a peelable seal and which bag once opened can be used as a litter box liner for the litter.

It is also an object of the present invention to provide a litter package in which the bag has flaps that can be extended over the edge of the litter box when the bag is used as a litter box liner and can then be gathered and tied in order to form a bag prior to disposal of the used litter.

The foregoing objectives are achieved by an animal litter composition which consists primarily of ground and uncompacted agricultural by-products. The term agricultural by-products as used herein is defined to include flax straw, flax shive, wheat straw, sunflower seed hulls, and the like. Decorticated flax straw (flax shive) is preferred. The flax shive is ground and screened to a particle size of between 10 to 22 U.S. Screen Mesh. The particle size of the flax shive is selected to assure absorbency, coating of fecal matter, and minimized tracking.

In addition to ground and uncompacted flax shive, the animal litter of the present invention may include a virucidal composition comprising from about 0.5 to about 5 percent by weight, based on the dry weight of the ground and uncompacted flax shive, of a surfactant, preferably anionic, and at least about 2 percent, based on the dry weight of the ground and uncompacted flax shive, of at least one acid selected from the group consisting of citric, malic, and mixtures of the acids.

In addition to the ground and uncompacted flax shive and virucidal composition, the animal litter of the present invention may include a fragrance. The fragrance may be any of a number of commercially available fragrances. A fragrance designated Q-6811, which is manufactured by Quest International of Mount Olive, N.J., is preferred.

Also in accordance with the foregoing objectives, there is provided an animal litter package which package comprises the animal litter described above contained in a bag with a peelable, sealed opening and having flaps extending from the peelable, sealed opening. The bag is formed of either a plastic film, a nonwoven/film laminate, a film/paper laminate or a wax/paper laminate. In use, the animal litter package is opened by peeling open the sealed opening of the bag and using the bag as a liner for a litter box. Once the litter has been used, the flaps on the bag are collected together to form a bag in which the litter may then be disposed.

Other objects and advantages of the invention will become apparent upon reading the following detailed description and upon reference to the drawings.

BRIEF DESCRIPTION OF THE DRAWINGS

FIGS. 1–6 are perspective drawings showing the sequential steps required in constructing an animal litter package in accordance with the present invention.

DETAILED DESCRIPTION OF THE INVENTION

Figure 7:
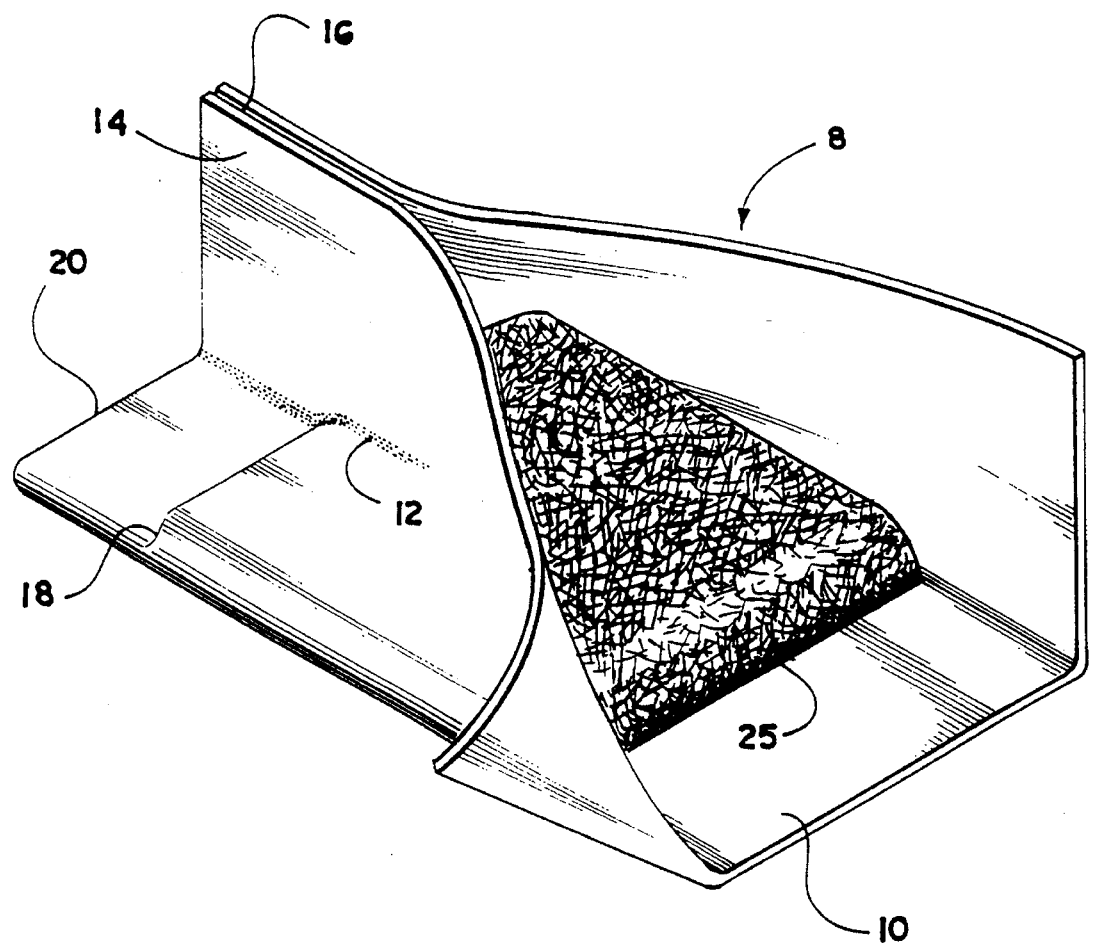
FIG. 7 is a perspective drawing of the animal litter package of the present invention partially opened.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

As stated above, the animal litter of the present invention comprises a major component of ground and uncompacted agricultural by-products. In addition to the ground and uncompacted agricultural by-products, we have found advantages result from adding small amounts of a virucidal composition to the litter material as well as small amounts of a fragrance.

With regard to the ground and uncompacted agricultural by-products, we have found that decorticated flax straw (flax shive), which has been screened to a predetermined particle size, can be used as a major component of a particularly desirable animal litter, especially for cats. Other agricultural by-products, including flax straw, wheat straw, sunflower seed hulls, and the like, are considered useful in making animal litter in accordance with the present invention.

Linen tow for ultimate use in the manufacture of linen papers is obtained by decorticating flax straw. The flax straw is decorticated by running the flax straw through a hammermill which detaches the desired outer bark or cortex of the straw from the woody inner portion. These two components are then crudely separated by air levitation techniques to yield a cortex-rich fraction termed tow and a woody fraction termed shive, which is discarded. In order to make the animal litter of the present invention, the flax shive is further screened to remove dust, fiber fragments, and other unwanted materials such as seeds. We have found that flax shive fragments called mid-cut shive having a length of 0.125 inch to 0.375 inch (U.S. Screen Analysis: 10 mesh to 22 mesh) provides an optimum litter size range for the practice of the present invention.

We have found that such flax shive has several desirable characteristics when used as an animal litter material. The flax shive is light in weight, having a density of about 9.9 pounds per cubic foot, as compared to about 48 pounds per cubic foot for clay based cat litters. A standard litter box has a volume of 0.15 cubic feet which would contain 7.2 pounds of clay or 1.2 pounds of shive. The chopped and screened flax shive also exhibits absorbency that is comparable to the commercially available clay based cat litters. The flax shive also coats fecal matter thereby keeping the rest of the litter clean for extended use.

The absorbency of the flax shive is shown by the following tests in which absorbency of the flax shive was compared to that of various clay based commercial cat litters. One gram (±0.01 gm dry weight) of mid-cut flax shive (particle sizes between about 10 and 22 U.S. Screen Mesh) was swirled in 100 cc of distilled water for various times. Likewise, one gram (±0.01 gm dry weight) of mid-cut flax shive was swirled in 100 cc of 1% saline solution for various times. Each suspension was then filtered through a 140 mesh screen, and the free fluid collected in a 100 cc graduated cylinder. Absorbency was determined by dividing the volume of retained solution (cc) by the shive dry weight(g). Likewise, powdered flax shive (particle sizes less than about 22 mesh) and long-cut flax shive (particle sizes greater than about 10 mesh) were tested for absorbency of distilled water and 1% saline solution. In addition, about 500 mgs of clay based commercial cat litter was exposed to the each of the test fluids (distilled water and 1% saline solution) for 60 minutes. Each clay sample was then centrifuged for 30 minutes. The supernatant was decanted and absorbency determined gravimetrically. The ratio of fluid absorption is expressed in terms of quantity (in cc) of water or saline solution absorbed per gram of dry absorbent (cc/g). Results of various tests for absorbency are reported in Tables 1 and 2 below. The tests were repeated twice with identical results.

SUMMARY OF TEST RESULTS

1. Mid-cut shive absorbency of 1% saline solution is higher than in distilled water.

2. Mid-cut shive has a higher absorbency capacity of 1% saline solution than long-cut shive.

3. To some extent, mid-cut shive has a comparable absorbency to clay after one hour exposure to the fluid.

4. Powdered shive absorbency is higher than mid-cut shive and is comparable to clay.

TABLE 1

ABSORBENCY COMPARISON BETWEEN SHIVE AND CLAY DURING DIFFERENT TIMES OF EXPOSURE TO 1% SALINE SOLUTION AND DISTILLED WATER

| | | Absorbency | |
| --- | --- | --- | --- |
| Type | Duration of Exposure (min) | 1% Saline Solution (cc/g) | Distilled Water (cc/g) |
| Mid-cut shive | 0.25 | 0.9 | 0.9 |
| Clay 1* | 0.25 | 1.7 | |
| Clay 2* | 0.25 | 1.4 | |
| Powdered shive | 2 | 3.9 | 2.9 |
| Powdered shive | 3 | 4.9 | 3.0 |
| Powdered shive | 6 | 5.7 | 3.1 |
| Mid-cut shive | 60 | 4.5 | 2.7 |
| Long-cut shive | 60 | 2.8 | 2.7 |
| Clay 1* | 60 | 5.5 | 3.8 |
| Clay 2* | 60 | 4.2 | 3.7 |

*Clay 1 - FRESH STEP cat litter manufactured by Clorox Company, Oakland, California 94612.
*Clay 2 - KITTY LITTER cat litter manufactured by Golden Cat Corporation, South Bend, Indiana 46601.

TABLE 2

MID-CUT SHIVE ABSORBENCY IN 1% SALINE SOLUTION AND IN DISTILLED WATER

| Time (min) | Absorbency 1% Saline Solution (cc/g) | Distilled Water (cc/g) |
| --- | --- | --- |
| 0.25 | 0.9 | 0.9 |
| 15 | 2.0 | 1.9 |
| 30 | 2.6 | 2.0 |
| 60 | 4.5 | 2.6 |
| 90 | 5.5 | |
| 120 | 6.6 | 3.3 |
| 180 | 8.5 | 3.8 |
| 240 | 8.3 | 3.7 |

While the flax shive constitutes the bulk of the animal litter in accordance with the present invention, we have found that the addition of a virucidal composition to the litter provides useful benefits. Particularly, the animal litter in accordance with the present invention may include a small percentage from about 0.5 to about 5 percent by weight based on the dry weight of the flax shive of a preferably anionic surfactant, and at least 2 percent based on the dry weight of the flax shive, of at least one acid selected from the group consisting of citric, malic, and mixtures of the acids. Such a virucidal composition is known in the art and is disclosed in Hossain et al. U.S. Pat. Nos. 4,828,912 and 4,897,304 which disclosures are incorporated herein by reference. Suitable anionic surfactants include sodium lauryl sulfate and Bioterge AS-40 manufactured by Stepan Chemical Company of Northfield, Ill.

Not only does the virucidal composition inhibit the spread of infection from virus in the litter material, the virucidal composition also inhibits the formation of odor cause by bacterial action on cat urine. In order to demonstrate the advantages of the virucidal composition in the litter, the following test was performed. A number of plastic cups was arranged into groups of four and filled with 15 g of mid-cut shive. In all cases, the fragrance level was 0.1% and the sodium lauryl sulfate level was 3%. Each group of four cups was then treated to contain 1, 3, 5, and 7% malic acid, and one cup in each group was treated with the same amounts of a 2 to 1 ratio of citric to malic acid. In addition, a group of controls containing a commercially available clay based cat litter (Hartz PH5 manufactured by Hartz Mountain Corporation of Harrison, N.J. 07020) was prepared. Each of the four cups of each group was inoculated with the following amount of liquid. The first cup from each group was spiked with 10 cc of fresh cat urine. The second cup from each group was spiked with 10 cc of artificial urine consisting of (DI water 97.09%, Urea 1.94%, NaCl 0.80%, $MgSO_4.7H_2O$ 0.11%, $CaCl_2$ 0.06%). The third cup from each group was spiked with 10 g of fresh cat feces. The fourth cup from each group was treated with 10 cc of water to act as a control. A dosage of 10 cc of urine per 15 g of litter represents a week's usage by a normal cat. The samples were placed in a hood and left open to the atmosphere. A panel of four testers compared the odor from the samples at the same time every day using a rating system ranging from 0 (raw mid-cut shive) to 10 (very offensive, feline odor). One tester was not able to distinguish a difference, and his response is not included. After three days, the samples began to develop an offensive odor. They were covered with plastic bags to contain and intensify the odor. The control sample exhibited no odor. The results show that increasing levels of virucidal formula reduce the degrees of offensive odor developed by cat urine over a period of several days. The results are reported in Table 3 below.

TABLE 3

EFFECT OF VIRUCIDAL AMOUNT AND COMPOSITION ON CAT URINE ODOR GENERATION ONE WEEK AFTER INOCULATION

| Virucidal Formulations % | Sample | Control | Cat Urine Added | Artificial Urine Added | Cat Feces Added |
|---|---|---|---|---|---|
| Malic Acid | | | | | |
| 1 | A | 0 | 4 | 3 | 10 |
| 3 | B | 0 | 3 | 3 | 10 |
| 5 | C | 0 | 2 | 0 | 10 |
| 7 | D | 0 | 1 | 0 | 10 |
| Citric Acid Malic Acid (2:1 ratio) | | | | | |
| 1 | E | 0 | 4 | 4 | 10 |
| 3 | F | 0 | 2 | 4 | 10 |
| 5 | G | 0 | 2 | 4 | 10 |
| 7 | H | 0 | 1 | 1 | 10 |
| — | Hartz PH5 | 0 | 4 | 4 | 10 |

In addition to flax shive and the virucidal composition, we have found that the addition of a fragrance to the animal litter provides additional benefits. Particularly, we have identified a number of commercially available fragrances which are nontoxic to animals and their caretakers and which when incorporated into the litter provide a pleasing aroma to mask the light odor of the flax shive. Those fragrances may include fragrances sold by Quest International of Mount Olive, N.J. under the designations Q-8976, Q-8977, Q-8978, Q-8979, and Q-6811. Q-6811, however, is preferred based on subjective testing.

Animal litter in accordance with the present invention is illustrated by the following examples.

EXAMPLE 1

Litter Formulation (by weight):
  100 parts of flax shive having particle sizes between about 10 and 22 U.S. Screen Mesh.
  10 parts of virucidal composition
  0.1 part of fragrance
Virucidal Composition (by weight):
  2 parts citric acid
  1 part malic acid
  1 part sodium lauryl sulfate
Fragrance:
  Q-6811 (Quest International).
The virucidal composition could vary from 5 to 15 parts and the fragrance could vary from 0.05 to 0.15 parts.

EXAMPLE 2

Litter Formulation (by weight):
  100 parts of flax shive having particle sizes between about 10 and 22 U.S. Screen Mesh.
  10 parts of virucidal composition
  0.1 part of fragrance
Virucidal Composition (by weight):
  2 to 4 parts malic acid
  1 part surfactant (Bioterge AS-40).

We have also discovered that it is particularly advantageous to supply animal litter, especially animal litter for cats, to the consumer in prepackaged form. The animal litter package of the present invention comprises a bag containing the requisite amount of the litter described above. The requisite amount of litter appears to be about 24 ounces. An equal volume of clay would weigh approximately 115 ounces. The bag is configured so that it can be easily opened and then used as a liner for a litter box. Once the litter has been used over a period of about three to five days, the edges of the bag can simply be regathered, tied together to form a bag, and disposed of in the normal fashion. The animal litter package of the present invention is a convenient means of dispensing the litter without pouring, which generates dust. In addition, the litter package allows disposal of the used litter without the necessity for touching the used litter material.

With respect to FIGS. 1–6, there is shown the sequential steps required for constructing the animal litter package 8 in accordance with the present invention. FIG. 1 shows a generally square web 10 of film, nonwoven/film laminate, film/paper laminate or wax/paper laminate. Preferably, the film is from 1.5 to 2 mils in thickness and is formed by coextruding a layer of low density, polyethylene and a layer of ethyl vinyl acetate (EVA). The bag for the litter package may also be formed from a web of a film/paper or wax/paper laminate. Berkshire Heat Seal Paper manufactured by Kimberly-Clark Corporation, the assignee of the present invention, is suitable for forming the paper layer of such film/paper or wax/paper laminate.

The web 10, which is preferably about 32 inches long and 32 inches wide, is folded as shown in FIG. 2, and heat sealed along primary heat seal line 12. By folding and sealing the web 10 along primary heat seal line 12, elongated flaps 14 and 16 are created which flaps are approximately 32 inches long and 5 inches in width. As shown in FIG. 3, the flaps 14 and 16 are folded along heat seal line 12 and lay flat against the main portion of the web. A second heat seal line 18 is then made. Heat seal line 18 creates a bottom flap 20. Flap 20 is approximately 8 inches wide and 11 inches long. Second heat seal line 18 also forms the bottom of the bag. As shown in FIG. 4, the bag is filled with the requisite amount of litter 25 (about 24 ounces of litter) in accordance with the present invention through the opening 22 (FIG. 3) and a third heat seal line 24 is made thereby sealing the litter into a section 27 of the bag which is approximately 16 inches long by 11 inches wide. The heat seal line 24 also creates a top flap 26. As shown in FIGS. 5 and 6, the top flap 26 and the bottom flap 20 are then folded over the section 27 containing the litter material and sealed with a label 28 which may include printed instructions for opening and use of the litter package.

FIG. 7 shows the litter package 8 which has been partially opened by first breaking the seal 28 and then peeling the package open along the heat seal lines 12, 18, and 24. Once the package 8 has been opened, the web 10 provides a liner for the litter 25 when it is placed into a litter box for a cat.

It is claimed:

1. An animal litter package comprising:

a bag with a peelable sealed opening and having flaps extending from the peelable sealed opening so that the bag can be opened by separating and pulling apart the flaps; and animal litter within the bag, wherein the package is opened by peeling open the peelable sealed opening of the bag so that it is adapted to provide a liner for the litter when the package is placed in a litter box.

2. The animal litter package of claim 1, wherein the peelable sealed opening is a peelable heat-sealed opening.

3. The animal litter package of claim 1, wherein the bag is made of a material selected from films, nonwoven/film laminates, film/paper laminates and wax/paper laminates.

4. The animal litter package of claim 3, wherein the bag is made of a coextruded film including a layer of low density, polyethylene and a layer ethyl vinyl acetate.

5. The animal litter package of claim 3, wherein the bag is made of a film having a thickness of from 1.5 to 2 mils.

6. The animal litter package of claim 1, wherein the package contains about 24 ounces of animal litter.

7. The animal litter package of claim 1, wherein the package contains animal litter that includes a fragrance.

8. The animal litter package of claim 1, wherein the package is further sealed with a label having printed instructions for opening and use of the litter package.

9. The animal letter package of claim 1, wherein the flaps on the package are adapted to be collected together after use to form a bag in which the litter may be disposed.

10. An animal litter package comprising:

a bag with a peelable sealed opening and having flaps extending from the peelable sealed opening so that the bag can be opened by separating and pulling apart the flaps; and animal litter within the bag, wherein the package is opened by peeling open the peelable sealed opening of the bag so that it adapted to provide a liner for the litter when the package is placed in a litter box.

11. The animal litter package of claim 10, wherein the peelable sealed opening is a peelable heat-sealed opening.

12. The animal litter package of claim 10, wherein the bag is made of a material selected from films, nonwoven/film laminates, film/paper laminates and wax/paper laminates.

13. The animal litter package of claim 12, wherein the bag is made of a coextruded film including a layer of low density, polyethylene and a layer ethyl vinyl acetate.

14. The animal litter package of claim 12, wherein the bag is made of a film having a thickness of from 1.5 to 2 mils.

15. The animal litter package of claim 10, wherein the package contains about 24 ounces of animal litter.

16. The animal litter package of claim 10, wherein the package contains animal litter that includes a fragrance.

17. The animal litter package of claim 10, wherein the package is further sealed with a label having printed instructions for opening and use of the litter package.

18. An animal litter package comprising:

a bag with a peelable heat-sealed opening and having flaps extending from the peelable heat-sealed opening so that the bag can be opened by separating and pulling apart the flaps; and animal litter within the bag, the animal litter having a density of about 9.9 pounds per cubic foot, wherein the package is opened by peeling open the peelable heat-sealed opening of the bag so that it is adapted to provide a liner for the litter when the package is placed in a litter box and wherein the flaps on the package are adapted to be collected together after use to form a bag in which the litter may be disposed.

* * * * *